Oct. 7, 1952     R. F. MOZLEY     2,613,317
CIRCUITS FOR OBJECT LOCATOR APPARATUS
Original Filed April 12, 1943     7 Sheets-Sheet 1

INVENTOR
ROBERT F. MOZLEY
BY
Paul B. Hunter
ATTORNEY

Oct. 7, 1952 R. F. MOZLEY 2,613,317
CIRCUITS FOR OBJECT LOCATOR APPARATUS
Original Filed April 12, 1943 7 Sheets-Sheet 2
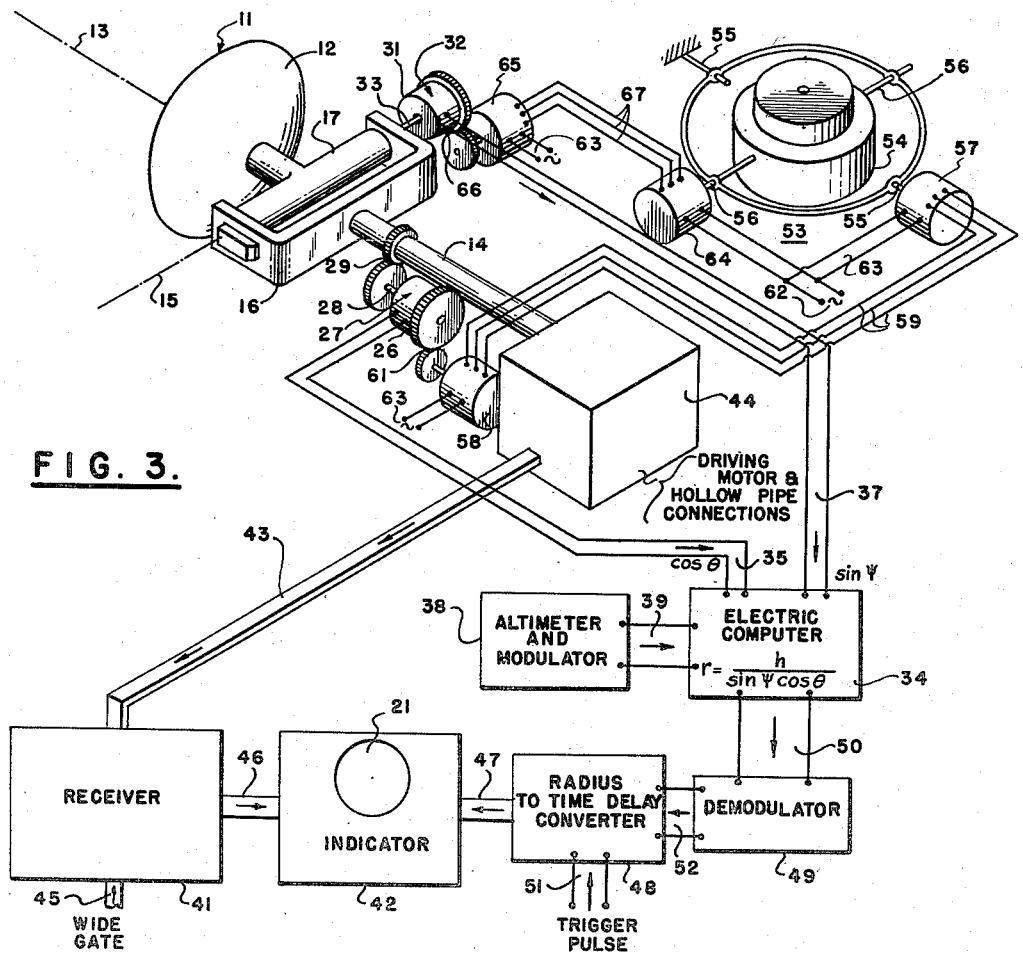
INVENTOR
ROBERT F. MOZLEY
BY
Paul B. Hunter
ATTORNEY Oct. 7, 1952 R. F. MOZLEY 2,613,317
CIRCUITS FOR OBJECT LOCATOR APPARATUS
Original Filed April 12, 1943 7 Sheets-Sheet 3
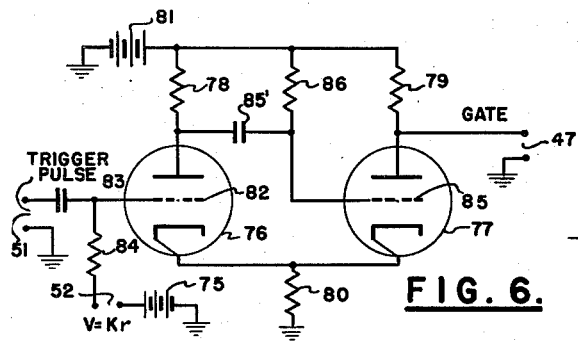
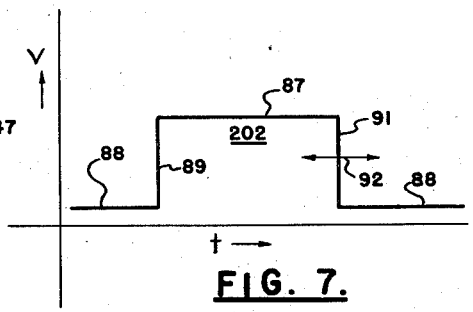
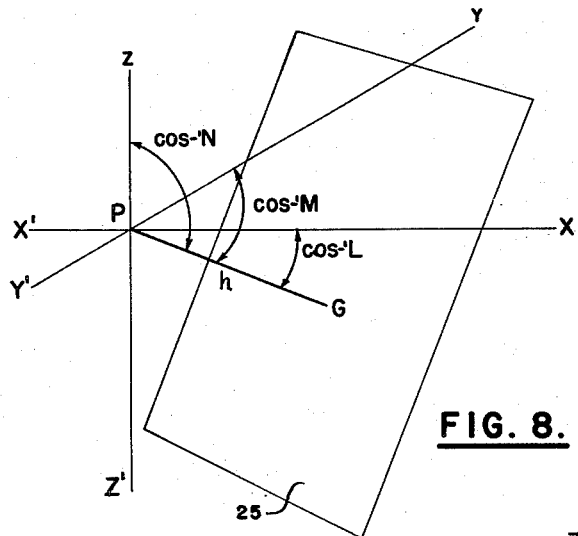
FIG. 6.
FIG. 7.
FIG. 8.
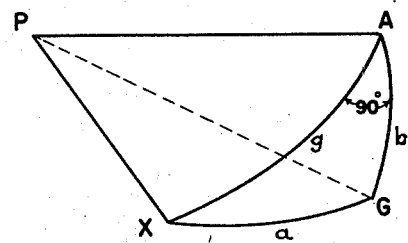
FIG. 9.
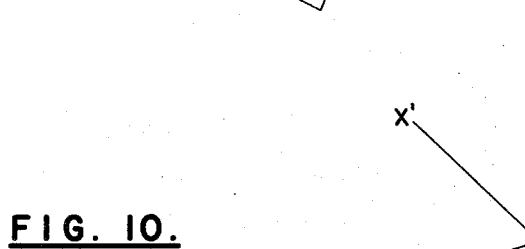
FIG. 10.
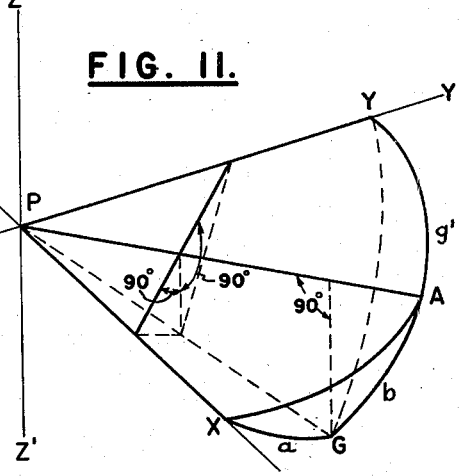
FIG. 11.
INVENTOR
ROBERT F. MOZLEY
BY
Paul B. Hunter
ATTORNEY

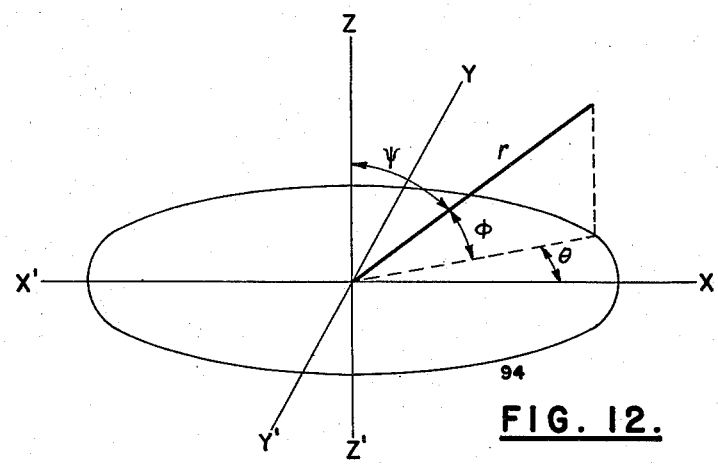
FIG. 12.
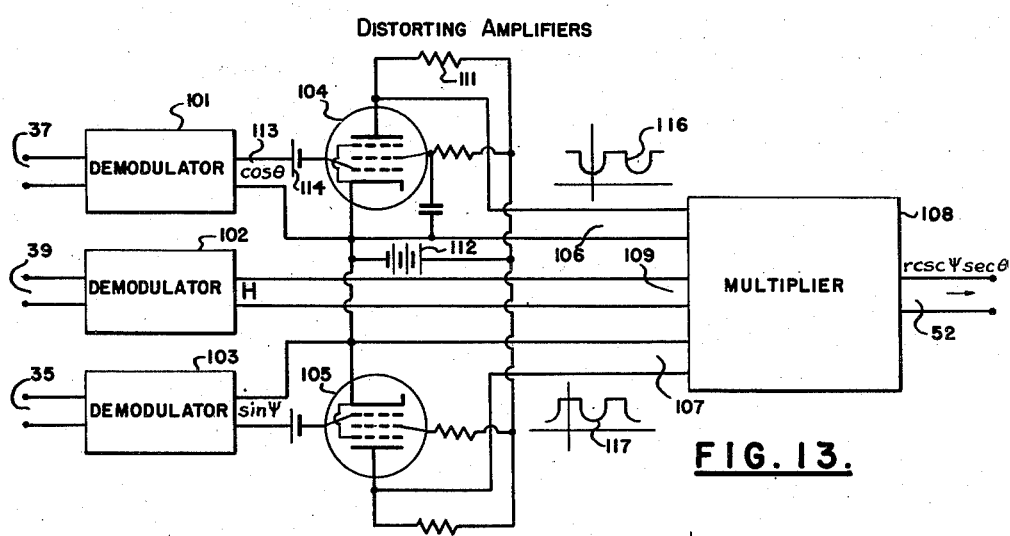
FIG. 13.
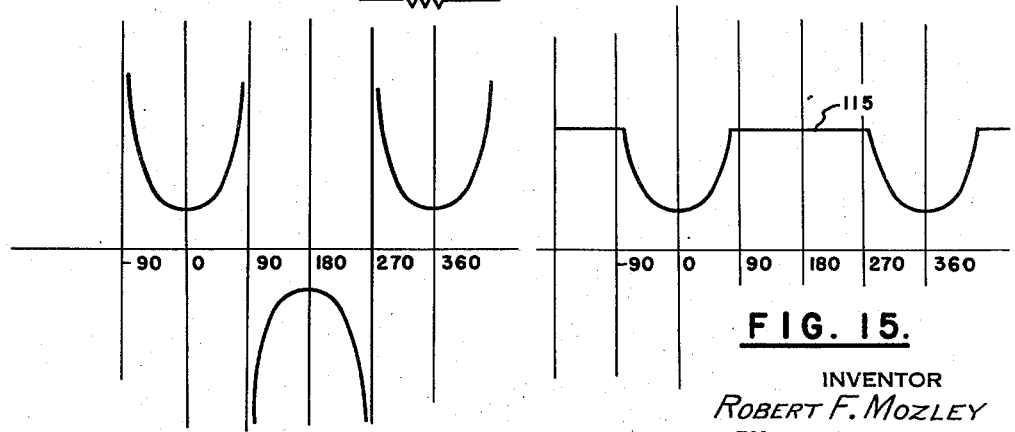
FIG. 14.
FIG. 15.
INVENTOR
ROBERT F. MOZLEY
BY
Paul B. Hunter.
ATTORNEY Oct. 7, 1952    R. F. MOZLEY    2,613,317
CIRCUITS FOR OBJECT LOCATOR APPARATUS
Original Filed April 12, 1943    7 Sheets-Sheet 5

INVENTOR
ROBERT F. MOZLEY
BY
Paul B. Hunter
ATTORNEY

Oct. 7, 1952  R. F. MOZLEY  2,613,317
CIRCUITS FOR OBJECT LOCATOR APPARATUS
Original Filed April 12, 1943  7 Sheets-Sheet 6

INVENTOR
ROBERT F. MOZLEY
BY
Paul B. Hunter
ATTORNEY

Patented Oct. 7, 1952

2,613,317

UNITED STATES PATENT OFFICE 2,613,317

CIRCUITS FOR OBJECT LOCATOR APPARATUS

Robert F. Mozley, Berkeley, Calif., assignor to The Sperry Corporation, a corporation of Delaware Original application April 12, 1943, Serial No. 482,807, now Patent No. 2,495,753, dated January 31, 1950. Divided and this application August 27, 1949, Serial No. 112,666

9 Claims. (Cl. 250—27)

This invention relates generally to aeronautical object locator apparatus and has reference more particularly to novel circuits useful in such apparatus where it is desired to locate objects without interference from ground reflections. This application is a division of Patent No. 2,495,753 granted January 31, 1950.

An object of the invention is to provide novel circuits for object locator apparatus such that objects between an airplane and the ground are detected and located without interference from the ground itself, the said circuits also being suitable for detecting objects projecting upwardly from the ground such as high buildings and other obstructions.

It is another object of my invention to provide object or target locator apparatus circuits for computing the products of sinusoidal functions or products of functions of various angles.

It is also an object of the invention to provide circuits for simulating cosecant and secant curves in response to sine and cosine indications.

It is a further object to provide circuits for object locator apparatus for producing a moving gate responsive to the distance of the aircraft to ground.

Other objects and advantages will become apparent as the description proceeds.

In certain types of radio locating or searching systems, what is known as type-C indication is employed. This signifies that a target or object which is to be detected from an aircraft, for example, is located by scanning with a radio beam which is caused to traverse a spiral course. In such apparatus an indicating device, such as a cathode ray oscilloscope, is provided in which a cathode ray beam is also caused to move spirally and to produce an indication on the screen of the cathode ray tube in case a target is intercepted by the scanning radio beam. This type of apparatus has the merit that the position of the target in both azimuth and elevation is indicated upon a single screen.

However, if the aircraft carrying the locating equipment is flying low or the distance range of the locator is greater than the altitude of the aircraft, the scanning radio beam will thus intersect the ground for a considerable solid angle of the angular range of the cathode ray oscilloscope indicator. Reflections from the ground will take place throughout the area of the screen corresponding to the portion of the solid angle of the scanning system subtended by the ground plane. In the event that a target should come in between the aircraft carrying the locating equipment and ground, such a target is liable to be obliterated by the ground reflections.

It is accordingly an object of my invention to provided methods and apparatus for enabling targets to be located anywhere within the angular range of locating equipment, regardless of the height at which the searching aircraft is flying or the relationship of the target to the ground plane.

Other and further objects will become apparent as the description proceeds.

In carrying out my invention in its preferred forms, I provide attachments for radio beam scanning apparatus for ascertaining the distance to ground and controlling the receiver of the scanning apparatus to eliminate ground reflection whenever the scanner is so oriented that the distance to ground along the radio beam is less than the normal linear or radial distance range of the apparatus.

In accordance with one embodiment of my invention, the distance to ground along the radio beam axis at any instant is computed electrically from the altitude of the aircraft and the instantaneous angles of the radio beam of the searching apparatus. Mechanism is provided for reducing the radial range of the locator to a distance slightly less than the computed distance to ground. For example, means may be provided for producing a square wave voltage having a time duration varying in accordance with the computed distance to ground. The indicator is provided with a voltage control for making the indicator effective only when the control is energized. The square wave, having a time duration corresponding to computed distance to ground, is applied to the voltage control of the indicator so that when the searching beam is directed toward the ground, the indicator remains effective only for a duration of time less than that required for a transmitted signal to travel a distance equalling the distance to ground along the radio beam axis and return along the same path to the radio locator. In this manner, any target between the aircraft and ground produces an indication, but the ground produces no indication or reflection.

In accordance with another embodiment of my invention, the distance to ground is directly measured electrically independently of any indications of altitude or angle. For this purpose I may utilize a moving gate electronic servo circuit which produces a voltage having a time delay corresponding to the distance to ground along the radio beam.

A better understanding of the invention will be afforded by the following detailed description considered in connection with the accompanying drawings, and those features of the invention which are believed to be novel and patentable will be pointed out in the claims appended hereto.

In the drawings,

Fig. 3 is a schematic diagram of a radio locator receiving system employing one embodiment of my invention, in which ground distance is automatically computed.

Fig. 4 is a schematic diagram of one form of remote angle indicating system which may be employed in connection with the apparatus of Fig. 3.

Fig. 5 is a schematic diagram of a modification in the arrangements illustrated in Figs. 3 and 4 which may be employed for electrical multiplication of angular indications.

Fig. 6 is a circuit diagram of a device for producing a time delay or gate length proportional to a voltage, which is in turn proportional to the distance to ground along the axis of the scanner of a radio locator.

Fig. 7 is a graph representing the gate produced by the apparatus of Fig. 6.

Figs. 8 to 12, inclusive, are perspective views of three dimensional diagrams, Fig. 8 being a diagram showing a ground plane in relation to a system of rectilinear coordinates, Figs. 9 and 10 being diagrams of spherical pyramids drawn to illustrate the manner of mathematically determining the relationship between the rectilinear coordinates of Fig. 8 and spherical coordinates, Fig. 11 being a diagram in which the representations of Figs. 8, 9 and 10 have been simplified and combined to form a single diagram and Fig. 12 being a diagram illustrating the conversion of rectilinear to spherical coordinates.

Fig. 13 is a circuit diagram of a modification in a portion of the apparatus of Fig. 3.

Fig. 14 is a graph of a secant curve representing one factor of a computation used in the apparatus of Fig. 3.

Fig. 15 is a graph of an electrical function simulating the curve of Fig. 14.

Figure 16:
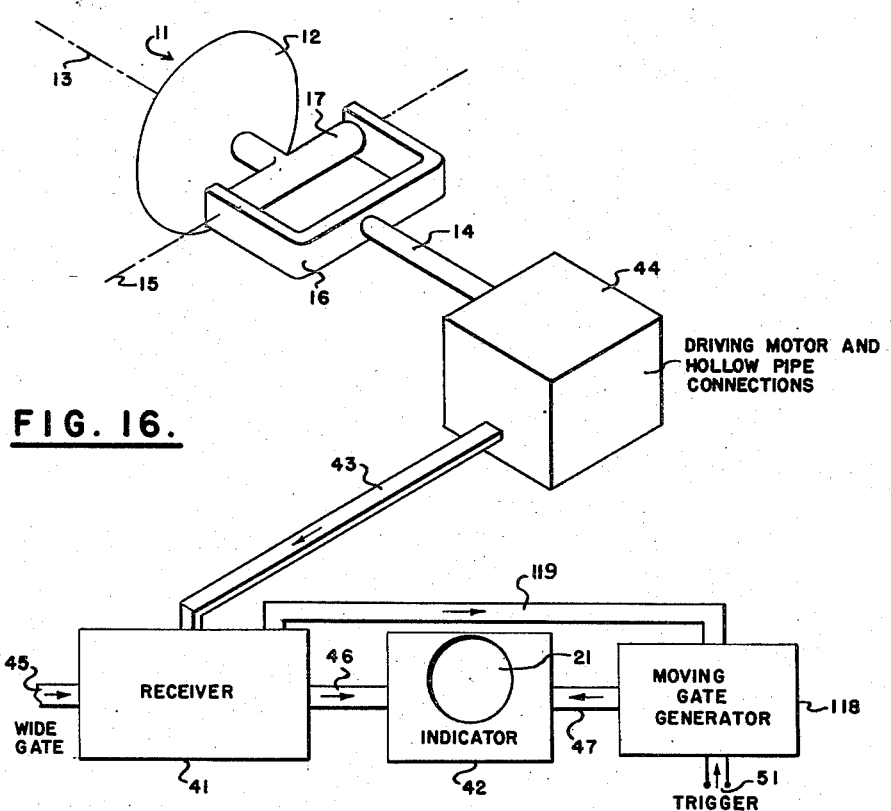

Fig. 16 is a schematic diagram of a radio locator receiving system corresponding to the apparatus of Fig. 3 but employing automatic electrical means of measuring distance to ground instead of employing means for computing such a distance to ground.

Figure 17:
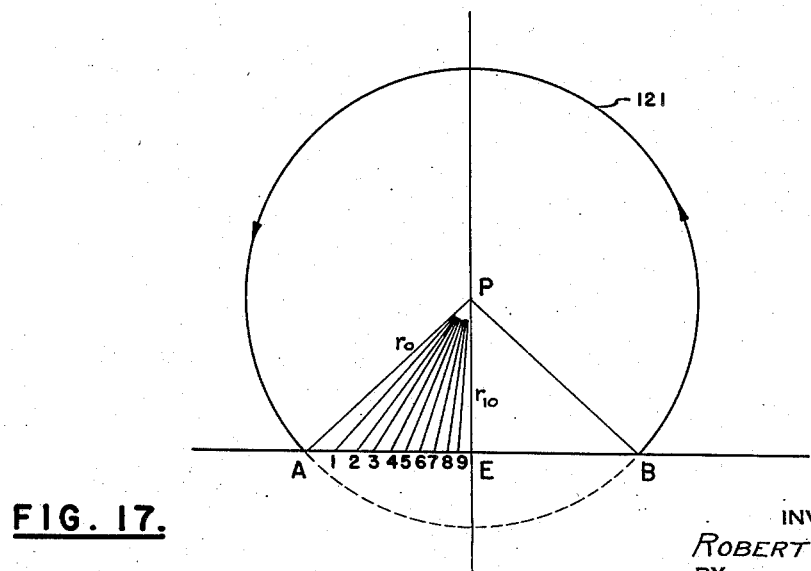

Fig. 17 is a schematic diagram illustrating the principle involved in electrically automatically changing the range in accordance with distance to ground.

Figure 18:
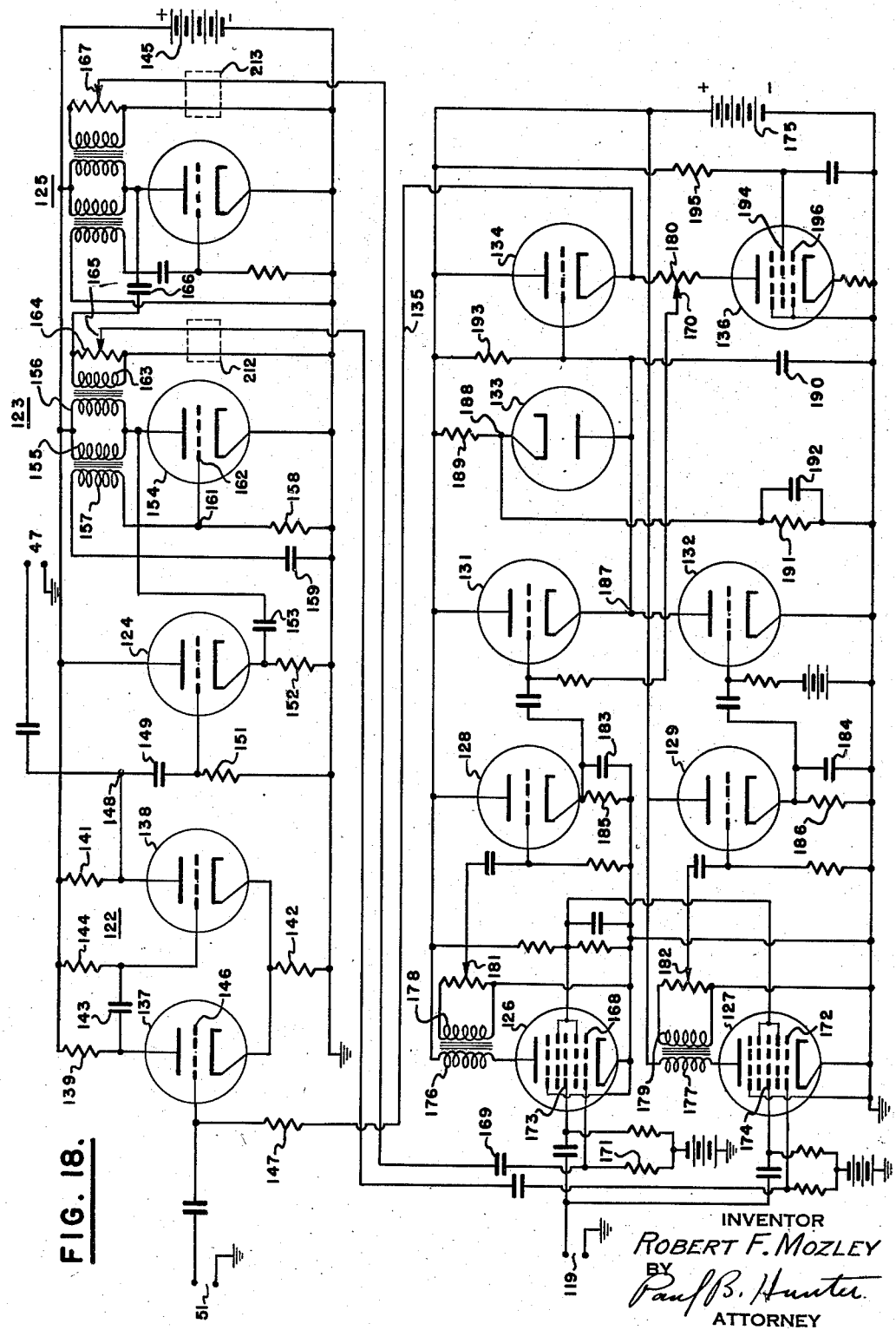

Fig. 18 is a circuit diagram of a portion of the apparatus of Fig. 16, more particularly the apparatus for auto ranging, and Figs. 19A to 19I, inclusive, are graphs explanatory of the principles of operation of the apparatus of Figs. 16 and 18.

Like reference characters are utilized throughout the drawings to designate like parts.

*General explanation of illustrative locator system*

For the sake of illustration, I shall describe a manner of carrying out my invention in connection with a spiral-sweep pulsed-microwave radio-beam scanner of the type represented schematically in Figs. 3 and 16. In this type of radio locator or searching scanner there is a radiator 11 comprising a parabolic reflector 12 with a parabola axis 13, and having a dipole antenna (not visible in the drawings) mounted at the focus of the parabola 12. The radiator 11 serves both for the purpose of projecting a radio beam in pulses of microwave oscillations, and for the reception of any pulses which may be reflected in case the beam is intercepted by a target or an obstacle to aviation. The parabola axis 13 is also the radio beam axis.

Such a system is illustrated and described in greater detail in the copending application Serial No. 441,188, filed April 30, 1942, by White, Holschuh, Mieher and Shepherd. It will be understood, however, that my invention is not limited to use with a spiral spinner scanner or with the specific type of radio locator described in said application, and schematically represented by drawings and the description of the present application.

In this type of radio locator the radiator 11 is so mounted as to be rotatable about a spin axis, represented in Fig. 3 by a supporting shaft 14, so that the beam 13 tends to describe a cone. The radiator is also pivoted about an axis 15 transverse to the spin axis 14 and which rotates with the shaft 14. The pivot axis 15 may be referred to as a nod axis. Nod motion of the radio beam 13 causes the apex angle of the cone described thereby to change progressively to produce a spiral sweep. For pivotally supporting the radiator 11, a yoke 16 may be mounted on the shaft 14 and the radiator parabola 12 may be mounted on a T member 17 which has trunnions supported by the yoke 16. The members 14, 16 and 17 are in the form of hollow pipes acting as a jointed wave-guide type of transmission line for transmitting microwave radio energy to and from the radiator 11.

Figure 1:
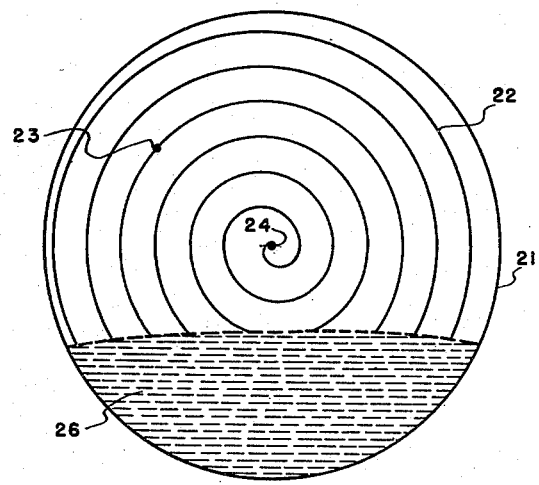
Fig. 1 is a view of the screen of an indicator for a type of radio locator system in which my invention may be employed.
Figure 2:
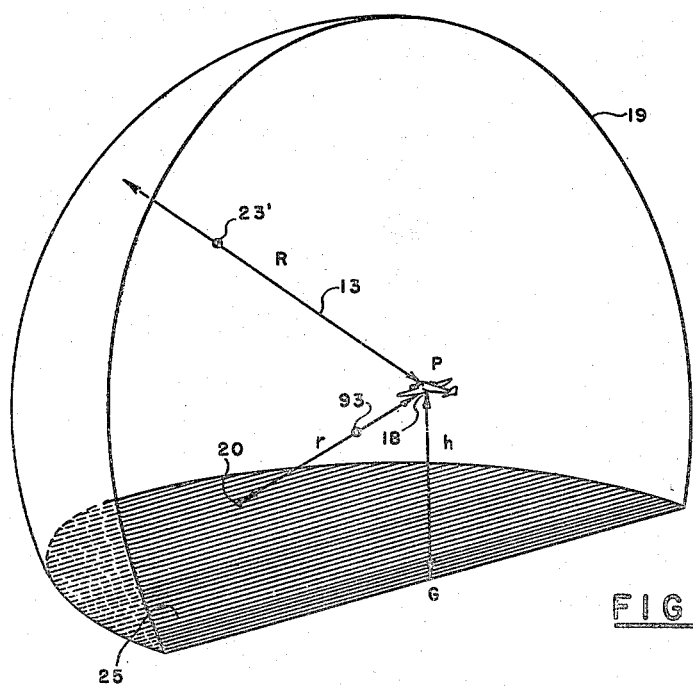
Fig. 2 is a perspective view of the ground plane and of an aircraft shown within a hypothetical hemisphere having a radius equalling the maximum range of a radio locator installed on the aircraft, the sphere being cut by the ground plane.

The radio scanner, together with associated apparatus which will be described more in detail hereinafter, is mounted on an airplane 18, shown in Fig. 2. In Fig. 2 there is shown a hemisphere 19 described by a radius of length R, which is the maximum radial range of the radio scanner. Since it is impracticable for the nod motion or rotation of the radiator 11 about the nod axis 15 to be made greater than 90° in most installations, the maximum solid angle which may be assumed to be scanned by the radiator 11 is the hemisphere 19 shown in Fig. 2. Means are provided for rotating the shaft 14 carrying the radiator 11 to produce a spinning motion, and means (not shown) are also provided for rotating the radiator 11 about the axis 15 to produce a nod motion. The nod motion is made relatively slow in comparison with the spin motion so that the radio beam axis 13 describes a spiral on the surface of the hemisphere 19. The projection of this spiral trace on a plane circle is represented in Fig. 1, which also represents the trace of the cathode ray beam of an indicator which is used in connection with the radio locator apparatus. Such an indicator may comprise a cathode ray tube having a screen 21. The spiral trace is represented by the curve 22 in Fig. 1.

In radio locator apparatus of the spiral sweep type, means are ordinarily provided for preventing the cathode ray beam of the indicator from striking the screen 21 unless a target is intercepted by the radio beam travelling along the axis 13. A spiral trace 22, shown in Fig. 1, therefore does not actually appear on the screen 21 under normal conditions. However, in the event of interception of the beam by a target, such as another airplane, or a sea-going vessel, or some other obstacle to aviation, such as a tower or a mountain peak, a bright spot 23 appears on the screen 21 and the angular position of the spot 23, as well as its radial distance from the center 24 of the screen 21, serves as an indication of the position of the target in azimuth and elevation with respect to the airplane 18. It will be understood that the screen 21 is provided with suitable calibrations so as to relate the indications thereon to the azimuth and elevation angles of the radio beam axis 13 intercepted by a target 23' (Fig. 2).

In the event that the altitude $h$ at which the plane 18 is flying is less than the radio range R of the radio locator equipment, the hemisphere 19 will have the lower portion thereof intersected by a plane 25, representing the ground plane or surface of the ground. Under this condition the lower segment 26 of the indicator screen 21, corresponding to the solid angle subtended by ground plane 25, will produce reflections for any position of the radio beam axis 13 in which the beam axis 13 strikes the ground. Accordingly, the segment 26 of the indicator screen 21 will apparently be covered with target indications, which may be referred to as ground targets or ground reflections. In the event that some obstacle to aviation or a hostile airplane should be present along a line drawn from the airplane 18 to a point 20 on the ground, the indication of such a target on the indicator screen 21 is liable to be obliterated by the mass of ground reflections 26.

For the purpose of overcoming difficulty from ground reflections, I eliminate such reflections from the screen 21 by reducing the radial distance range of the radio locator equipment from the maximum value R to shorter range values while the radiator 11 is in such angular positions that the radio beam axis 13 strikes the ground.

The problem of eliminating surface reflections arises when an aircraft is flying over bodies of water as well as when flying over land masses, and I employ the term "ground" in the description and claims to refer to the surface of such bodies of water as well as to the earth's land surface.

*Computer type ground reflection eliminator*

For eliminating ground reflections in the type of apparatus illustrated in Fig. 3, the radial distance $r$ to ground is computed from the angular positions of the radiator 11 and the altitude of the airplane, and the range of the radio locator apparatus is automatically reduced in accordance with the computed distance to ground. In order to obtain continuous indications of the angular positions of the radiator 11 for the computation of radial distance to ground, suitable angular position indicators are provided. Preferably remote position indicators are employed in order to simplify the construction. For example, I may utilize a transmitter 26 of the type used in conventional electrical angle transmission systems, and arranged for transmitting an electrical indication instead of a mechanical indication to a distance.

The transmitter 26 is provided with a stator 27 and a rotor (not visible in Fig. 3) secured to a shaft 28, which in turn is mechanically connected by gearing 29 to the spin axis driving shaft 14. For reasons which will be explained hereinafter, the stator 27 may also be so mounted as to be adjustable in angular position.

For transmitting indications of nod angle, a similar angle transmitting system may be provided comprising a transmitter 31 with a stator 32 having a rotor (not visible in Fig. 3) secured to a shaft 33 which is secured to the member 17 directly supporting the radiator 11. As in the case of the stator 27, the stator 32 may also be so mounted as to be adjustable in angular position, for reasons which will be explained hereinafter.

Suitable means are provided for continuously computing the radial distance to ground in terms of altitude and the angular indications provided by the transmitters 26 and 31. For example, an electric computer 34 may be provided having one input connection in the form of a pair of electrical conductors 35 from the spin angle transmitter 26, and a second input connection in the form of a pair of electrical conductors 37 from the nod angle transmitter 31. For indicating altitude, suitable apparatus represented by a rectangle 38 may be provided for producing an electrical indication proportional to altitude. Apparatus suitable for this purpose is shown and described in U. S. Patent Re. 21,955, November 25, 1941, to J. G. Chaffee. The apparatus 38 has an output connection through a pair of conductors 39 which serve as a third input connection for the computer 34.

It will be understood that microwave pulse radio locator apparatus of the type illustrated includes a radio receiver 41 and an indicator 42 having the screen 21 on which the indications of the presence of a target appear. Such a receiver has an input connection, ordinarily in the form of a rectangular hollow pipe wave-guide 43, leading from the radiator 11. In the schematic drawing there is shown a box 44 which is assumed to contain a driving motor for rotating the shaft 14, as well as suitable hollow pipe connections for transmitting to the pipe 43 radio frequency energy received through the hollow shaft 14.

In such systems also a suitable transmitter (not visible in the drawing) is provided for transmitting pulses from the radiator 11 and associated with the apparatus there is also a trigger pulse source (not shown) for synchronizing the transmitter and the receiver 41. Such a trigger pulse source is arranged for synchronizing a wide gate supplied to a receiver connection 45 after the termination of the transmitted pulses, for rendering the receiver responsive only to reflected signals. A suitable connection 46 is provided from the receiver 41 to the indicator 42 for producing indications when reflections are received by the receiver 41.

The indicator 42, however, is also provided with a control connection, represented by a pair of conductors 47, for effectively reducing the range of the target responsive apparatus comprising the receiver 41 and the indicator 42 in accordance with signals supplied to the control connection 47. Although the apparatus is shown as having the control connection 47 applied to the indicator 42, it will be understood that the arrangement may also be such that the control connection is applied to the receiver 41, or to some other suitable portion of the apparatus.

In the specific embodiment of the apparatus illustrated, the effective distance range of the target responsive apparatus is controlled by controlling the length of the interval of time during which the apparatus is effective. To this end, means responsive to the output of the computer 34 are provided for producing a variable-length voltage gate or square wave which is applied to the input connection 47 of the indicator 42. Such means may take the form of an electronic circuit designated as a radius-to-time-delay converter, represented in Fig. 3 by a rectangle 48. For reasons which will be explained hereinafter, the output indication of the computer 34 in the embodiment of Fig. 3 is in the form of a modulated alternating current or voltage having a peak amplitude varying in accordance with the radial distance to ground $r$. Under such conditions, a demodulator 49 may be interposed between the computer 34 and the radius-to-time-delay converter 48, for producing a "radius" voltage varying as the amplitudes of the voltage peaks in the alternating output of the computer 34.

As shown, there is a pair of conductors 50 serving as an output connection from the computer 34 and an input connection to the demodulator 49, and there is a pair of conductors 52 serving as an output connection from the demodulator 49 and an input connection to the radius-to-time-delay converter 48. The device 48 may also have a trigger pulse connection represented by a pair of conductors 51 for synchronizing it with the pulse transmitter (not shown) which also synchronizes the wide gate 45 of the receiver 41.

Although my invention is not limited to a particular method of mounting the radio locator apparatus, the electrical computation of radial distance to ground may be simplified, and accordingly a simpler form of electrical computer 34 may be employed, if the equipment is so mounted, or the aircraft carrying it is so flown, that the shaft 14 remains horizontal, and some reference axis transverse to the shaft 14 also remains horizontal. For example, the equipment may be mounted on a platform maintained horizontal by suitable gyroscopic controls, or the radiator 11 may be mounted in the nose of an aircraft with the axis of the shaft 14 along the fore and aft line of the fuselage, and the aircraft may be flown level whenever the indicator 42 is to be observed. However, to avoid necessity for maintaining the apparatus in a predetermined level plane, whether it is mounted directly on the aircraft or on a platform movable with respect to the aircraft, I may also provide suitable means for compensation of variations in the reference points for spin and nod angle from fixed references which would exist for level flying conditions. To this end, the stator 27 of the spin angle transmitter 26 is made adjustable in angular position, and, likewise, the stator 32 of the nod angle transmitter 31.

For adjusting the angular positions of the stators 27 and 32 to predetermined reference positions, a gyro system 53 may be provided comprising a schematically represented gyroscope 54 with a gimbal shaft 55 parallel to the axis of the spinner driving shaft 14, and a perpendicular shaft 56 which remains horizontal by virtue of the action of the gyroscope 54, which maintains its axis vertical. Angular transmission systems are provided for adjusting the angular positions of the stators 32 and 27 in accordance with relative angular positions of the gyroscope shafts 55 and 56.

For adjusting the angular position of the stator 27, a self-synchronous angular transmission system, such as a "Selsyn" system for example, may be provided comprising a "Selsyn" transmitter 57 and a "Selsyn" receiver 58 with polyphase conductors 59 joining the transmitter and receiver 57 and 58. It will be understood that the transmitter 57 has a rotor secured to the gyro fore and aft shaft 55, and the receiver 58 has a rotor mechanically connected through gearing 61 to the spin axis angle transmitter stator 26 for adjusting the position of the stator 26 to compensate for roll of the aircraft or of the platform on which the radio locator may be mounted. It will also be understood that such self-synchronous systems are provided with a source of single-phase exciting current 62 through pairs of conductors 63 leading to both the transmitter and receiver.

A similar self-synchronous transmission system for compensating the angular indication of the nod axis is provided comprising a "Selsyn" transmitter 64 with a rotor secure to the gyroscope axis 56, a receiver 65 with a rotor mechanically connected by gearing 66 to the angular transmitter stator 32, and conductors 67 joining the transmitter 64 and the receiver 65. The same source of exciting current 62, supplied through conductors 63, may be provided for the transmitters 64 and receiver 65.

Although other structural arrangements may be utilized, for the sake of simplicity in the drawings, the nod angle transmission devices 31 and 65 have been shown as moving with the yoke 16 and therefore necessarily supported by suitable members secured to the shaft 33. This would necessitate the use of slip rings, or the like (not shown) for carrying the electrical connections through the conductors 37, 67, etc. It will be understood that in practice the transmitter 31 may be connected to the means (not shown) for rotating the radiator 11 about the nod axis 15.

The transmitters 26 and 31 may, if desired, be of the type sold as "Telegon" transmitters, represented schematically in Fig. 4. In such apparatus there is a stationary exciting winding 68 arranged for magnetizing an axially extending magnetic rotor 69 with transverse projections 71. There is a stator comprising a pair of crossed pickup windings 72 and 73 arranged at right angles to one another and having magnetic axes perpendicular to each other and to the axis of the rotor shaft 28. For use in my apparatus, the windings 72 and 73 are mounted on the angularly adjustable stator frame 27 which may have a shaft 74 secured thereto connected to the gearing 61 of Fig. 3.

For use with the type of computer 34, described for the sake of illustration in the present application, only one of the stator windings 72 and 73 need be employed, or, if desired, the stator windings 72 and 73 may be connected in series to the output conductors 35 or 37. Alternating voltage having the same frequency as the source supplied to the exciting winding 68 is induced in the pickup windings 72 and 73. The arrangement is such that as the rotor 69 rotates with the shaft 28, the alternating voltages vary in peak value or are modulated, as the sine or cosine of the angle, according to the reference point taken.

The apparatus 38 may comprise a known form of altimeter such as that shown and described in the above-mentioned Reissue Patent 21,955, measuring vertical distance to ground (not shown) with a source of alternating current and means driven by the altimeter for varying the amplitude of the alternating current in accordance with the altimeter indication. In this manner, the device 38 produces a modulated alternating voltage fluctuating in peak value in accordance with the altitude indication. The altitude indication is therefore of the same type as that provided by the transmitters 26 and 31.

The computer 34 may be of the type described in the copending application of Herbert Harris, Jr., Serial No. 474,052, filed January 28, 1943, now U. S. Patent No. 2,497,883 dated February 21, 1950, in which an output is produced proportional to a product or quotient of the amplitudes or envelopes of several modulated input alternating currents or voltages.

The radius-to-time-delay converter 48 may comprise a pair of electric valves, such as vacuum tubes, connected in cascade, as illustrated in Fig. 6. As illustrated, it comprises a pair of triodes 76 and 77 having load resistors 78 and 79, respectively, and a common cathode resistor 80 with a common source of anode current 81. The triode 76 has a control electrode or grid 82 coupled through a coupling condenser 83 to the trigger pulse input terminals 51, and connected through a grid resistor 84 to the radius voltage input terminals 52. The tube 77 has a control electrode 85 capacity coupled from the anode of the tube 76 by a condenser 85′ and positively biased by means of a resistor 86 connected to a point at positive potential, for example, to the positive terminal of the anode supply source 81. For adjusting the tubes to the proper portions of their characteristic curves a bias source 75 may be provided for the tube 76.

The circuit of Fig. 6 is designed to produce a square wave 87, as illustrated in Fig. 7, having a fixed amplitude and having a time duration $t$ dependent upon the voltage applied between the radius voltage input terminals 52. In Fig. 7 the voltage amplitude of the square wave is plotted vertically and time is plotted in a horizontal direction.

Since the control electrode 85 of the tube 77 is positively biased, the tube 77 normally conducts current, a large voltage drop takes place in the load resistor 79, and the voltage between the gate output terminals 47 is a minimum, as represented by the portion 88 of the graph of Fig. 7. When the circuit is triggered by a trigger pulse applied to the terminals 51, which also triggers the transmitter (not shown) and the delayed wide gate 45 of the receiver 41, the tube 76 becomes conducting driving the control electrode 85 of the tube 77 negative, so that the voltage output of the tube 77 appearing between the gate terminals 47 abruptly rises along the line 89 in the graph of Fig. 7.

The tube 76 remains conducting for a period of time depending upon the magnitude of the radius voltage supplied between the terminals 52. Thus, the voltage applied at the radius voltage terminals 52 serves as a variable bias for the tube 76.

After the trigger pulse has died away the current flow through the tube 76 is determined by the grid bias, which in turn depends upon the magnitude of the voltage applied at the radius terminals 52. This current flows through the cathode resistor 80 and thereby controls the cathode bias of the tube 77. The greater the voltage at the terminals 52, the greater the potential of the cathode of the tube 77 and therefore the greater the length of time required for the coupling condenser 85′ to discharge sufficiently for the potential of the control electrode 85 to rise to cutoff and again render the tube 77 conducting. When the tube 77 becomes conducting, the output voltage across the gate terminals 47 again falls along the line 91 to the minimum value of the graph of Fig. 7. As represented by the double arrow 92 in Fig. 7, the portion 91 of the graph may be moved to the right or to the left by varying the magnitude of the voltage supplied between the radius terminals 52.

Since the computer 34 continuously computes the radial distance to ground, that is, the distance along the radio beam axis 13, the time duration of the portion 87 of the graph in Fig. 7 represents the distance to ground. The indicator 42 has a control gate applied to its control terminals 47 which permits the indicator to be effective only for a time duration fixed by the length of the control gate. The adjustment of the receiver 41 and the indicator 42 is such that the time required for a signal to be transmitted the distance represented by the length of the control gate 87 is slightly greater than the actual time duration of the gate 87.

Consequently, if any target or obstacle should appear at a point 93, Fig. 2, between ground and the airplane 18, an indication thereof will appear upon the screen 21 of the indicator 42. However, after the time interval required for a transmitted wave to reach ground and the reflected wave to traverse the entire distance $r$ (Fig. 2) from a point on the ground back to the airplane 18, the indicator 42 will have become unresponsive and no ground target indication or ground reflection will be produced on the indicator screen 21.

*Operation in general*

The operation of the apparatus of Fig. 3 as a whole is briefly as follows when level flight is assumed. With respect to the aircraft supporting the radio locator, the radiator or scanner 11 executes a spiral motion causing the beam 13 to sweep a solid angle of space which may be a complete hemisphere. If any target intercepts the beam 13, a bright spot 23 appears on the screen 21 (Fig. 1) in a position corresponding to that of the target. However, the computer 34, responsive to spin angle, nod angle, and altitude continuously computes the distance to ground along the beam 13 and reduces the radial distance range of the apparatus to a value just under the radial distance to ground whenever the beam 13 points toward the ground plane 25 (Fig. 2). In this manner ground reflections are avoided. For the case when the spinner shaft 14 is horizontal and there is no pitch or roll of the support for the scanner, the computer 34 may be arranged to solve the equation:

$$r = \frac{h}{\sin \psi \cos \theta} = h \csc \psi \sec \theta$$

where $r$ is the radius or length of the beam 13 from the scanner 11 to the intersection of the beam with ground plane 25, $\psi$ is the nod angle, and $\theta$ is the spin angle. The nod angle $\psi$ is measured from the spin axis, the axis of the spin shaft 14, and the spin angle $\theta$ is measured from a reference point vertically below the shaft 14, which is assumed to be horizontal for this case. The angle $\psi$ never exceeds 90° in practice and never becomes negative, so that $\sin \psi$ never becomes negative. When the beam 13 points above the horizon, so that it cannot strike the ground plane the angle $\theta$ lies between 90° and 270° and $\cos \theta$ is negative, making the computed value of $r$ theoretically negative. However, by means which will be described hereinafter, the cosine factor may be prevented from becoming negative and may be caused to assume a suitable constant value for spin angles between 90° and 270°. Likewise when $\psi$ is very small or $\theta$ is close to 90° or 270° the mathematical value of $r$ becomes very large but values of $r$ greater than R, the maximum range of the apparatus are without significance and there is no need for the computer to be capable of producing an indication of a computed result greater than R.

In case the assumed level condition no longer exists and the support for the location apparatus rolls, i. e., rotates around the axis of the spinning shaft 14, the effect of roll is fully compensated by correction of the spin angle $\theta$ by adjustment of the stator 27, by means of the gyroscope system 53. Provided pitch does not become excessive, it is substantially compensated by correction of the nod angle $\psi$ by adjustment of the stator 32 by means of the gyroscope system 53.

In case the spinner shaft 14 is not assumed to be normally horizontal, a more complex solution for $r$ is required and the principle involved may best be understood by a mathematical analysis.

For the sake of simplifying the construction, I have referred to the possibility of making a certain simplification in the computation of radial distance to ground, and I have referred to the possibility of mounting the apparatus in a particular manner with respect to the aircraft to simplify the computation. However, my invention is not limited to the mounting arrangement specifically suggested. The principle involved in the computation or radial distance to ground will, therefore, first be explained for the general case where the radio locator apparatus is mounted in any desired position in relation to an aircraft and the supporting apparatus therefor is free to assume any angular position with respect to the horizontal. The length of the radius $r$ along the radio beam 13 is to be ascertained in terms of the aircraft altitude $h$ and the angular coordinates of the direction of the beam.

*Computation of distance to ground*

For the general case, the ground plane 25 may be assumed to be oblique with respect to any set of coordinates. The principle involved will be better understood by considering the equation of the ground plane 25 in spherical coordinates about P as an origin. The equation of the ground plane in Cartesian or rectilinear coordinates is:

$$Lx + My + Nz - h = 0 \qquad (1)$$

where $h$ is the altitude of aircraft and therefore the length of a normal PG from the origin P to the ground plane 25, and L, M and N are the direction cosines of the normal PG with respect to the X'X, Y'Y and Z'Z axes shown in Fig. 8.

The projection of the line PG on the XY plane is along a line PA shown in Fig. 11. A plane through PAG includes the Z'Z axis and is perpendicular to the XY plane.

Referring to Fig. 9, and applying the theorems of spherical trigonometry, since the dihedral angle XAG is a right angle, $$\cos a = \cos g \cos b \qquad (2)$$

where $a$ = the angle XPG
$g$ = the angle XPA
$b$ = the angle GPA

Referring to Fig. 10, since the dihedral angle YAG is a right angle, $$\cos a' = \cos g' \cos b \qquad (3)$$

where:

$a'$ = the angle GPY
$g'$ = the angle YPA
$b$ = the angle GPA
since $g' = 90 - g$ from Equation 3

$$\cos a' = \sin g \cos b \qquad (4)$$

Referring to Fig. 8 and Fig. 9 or Fig. 10:

$$L = \cos a = \cos g \cos b \qquad (5)$$
$$M = \cos a' = \sin g \cos b \qquad (6)$$
$$N = \cos (90° + b) = -\sin b \qquad (7)$$

Referring to Fig. 12 and converting to spherical coordinates:

$$x = r \cos \phi \cos \theta \qquad (8)$$
$$y = r \cos \phi \sin \theta \qquad (9)$$
$$z = r \sin \phi \qquad (10)$$

by substituting values from Equations 5 to 10 in the equations for the ground plane, Equation 1, the ground plane equation in spherical coordinates is obtained:

$$r = \frac{h}{\cos b \cos g \cos \phi \cos \theta + \cos b \sin g \cos \phi \sin \theta - \sin b \sin \phi} \qquad (11)$$

If the Z'Z axis is assumed to be the spin axis through the shaft 14 of the scanner, the spin angle is $\theta$ and the nod angle $\psi$ (measured from the Z'Z axis instead of from the XY plane) is $90 - \phi$. Equation 11 may then be rewritten $$r = \frac{h}{\cos b \cos g \sin \psi \cos \theta + \cos b \sin g \sin \psi \sin \theta - \sin b \cos \psi} \qquad (12)$$

The angles $b$ and $g$ are the angles of the scanner supporting framework with respect to the ground plane 25. Since the gyroscope 54 maintains a level, the angles $b$ and $g$ may be obtained also from the gyroscope.

For a very general case in which the supporting framework of the scanner is free to vary in angular relationship to the ground plane, the computer 34 may be supplied with angular inputs from the gyro transmitters 64 and 57 as well as the spin and nod angle transmitters 26 and 31, and the altimeter 38. In this case the computer 34 is designed to solve Equation 12 above. It is unnecessary, however, for the computer 34 to be capable of computing values of $r$ greater than R, the maximum possible range of the radio locator equipment.

*Simplified computation*

If the aircraft is assumed to be so flown that the spin axis remains parallel to the ground, which is usually the case for gun director systems, the angle $b$ is zero. If the aircraft is flown without either pitch or roll, in general, or if the spin axis is parallel to the fore and aft line of the aircraft, and the aircraft is flown without pitch, the angle $g$ is a constant, and becomes zero if the X'X axis is assumed to be vertical.

With this simplification, Equation 12 becomes $$r = \frac{h}{\sin \psi \cos \theta} \qquad (13)$$

This simplifies the apparatus required to form the computer 34.

If the spin axis of the scanner is parallel to the fore and aft line of the aircraft, roll of the craft is fully compensated by correction of the spin angle $\theta$, as shown in Fig. 3, by means of the gyro transmitter 57 for adjusting the stator of the spin angle transmitter 26. Likewise, if the pitch of the aircraft does not become excessive any error due thereto in employing the simpler equation, 13, is substantially compensated by modification of the indicated nod angle $\psi$ by means of the gyro transmitter 64, which adjusts the angular position of stator of the nod angle transmitter 31.

*Modified computation*

The electric computer 34 has been represented as being so designed as to divide a variable voltage by the product of two other variable voltages. In order to obviate the necessity for utilizing a computer capable of handling two separate input quantities in the denominator, I may provide means for multiplying the voltages cosine $\theta$ and sine $\psi$ supplied by the inductor pairs 35 and 37 before the voltages enter the computer. For example, I may utilize an electro-dynamic voltage multiplying system.

As illustrated in Fig. 5, the voltages induced in the stators 27 and 32 of the angle transmitters 26 and 31 may be multiplied by utilizing a cascade connection. One of the transmitters, for example the transmitter 31, may have a rotor magnetizing winding 95 energized by the source of exciting current 63, and a pick-off winding 96. It will be understood that the pick-off winding 96 is connected by means of a shaft 97 or the like to the gearing 66, shown in Fig. 3, to maintain the stator in the proper angular adjustment with respect to the horizontal.

The other angle transmitter, in this case the transmitter 26, has its rotor exciting winding 68 connected to the pick-off winding 96 of the transmitter 31. The rotor of the transmitter 31 rotates with the shaft 33 according to the nod angle of the radiator 11 and the rotor 69 of the transmitter 26 is driven by the shaft 28 according to the spin angle of the radiator 11. The voltage induced in the pick-off winding 96 has the frequency of the excitation source 63 and is proportional to the product of the voltage of the input source 63, which is constant, and the sine of the angular position of the rotor shaft 33.

A sinusoidally modulated current is utilized for magnetizing the rotor 69 of the transmitter 26. Accordingly, a voltage is induced in its pick-off winding 72 which has the frequency of the excitation source 63, but has a peak value or amplitude proportional to the product of the sine of the angular position of the shaft 33 and the cosine of the angular position of the shaft 28.

It will be understood that the angular reference points are so chosen that the function is the sine function in one case and the cosine function in the other case.

The voltage appearing in the pick-off windings 72 may be supplied to a suitable quotient computer as a divisor. It will be understood that a voltage modulated in accordance with the altitude will also be supplied to the computer so that the result is the quotient of the altitude voltage and the voltage supplied by the cascaded transmitters 31 and 26 of Fig. 5.

If desired, necessity for the use of a quotient computer may be eliminated by converting the voltages supplied by the transmitters 31 and 26 into a quantity varying as the reciprocal of the product, or two separate voltages proportional to the cosecant and the secant of the nod angle and the spin angle, respectively, may be produced.

For the purpose of not only producing such a reciprocal voltage or voltages, but also producing a voltage or voltages of constant maximum amplitude for the angles which would have negative values of the secant or the cosecant, I may utilize a distorted amplifier circuit such as shown in Fig. 13, for example.

In the arrangement of Fig. 13, demodulators 101, 102 and 103 are provided for converting the modulations of the carrier voltages between the conductor pairs 37, 35 and 39, respectively, into fluctuating voltages representing the envelopes with the carrier (excitation) frequencies removed. For converting the output voltages from demodulators 101 and 103 into voltages representing the secant and the cosecant, respectively, distorting amplifiers 104 and 105 are provided. These may be electric valves of the vacuum tube type, for example, such as pentodes having control electrode or grid circuits connected to the outputs of the demodulators 101 and 103, respectively, and having load circuits with output connections 106 and 107, respectively, serving as input connections to a schematically represented multiplier circuit 108. It will be understood that such pentodes also have screen grids and suppressor grids.

The altitude demodulator 102 may have an output connection comprising a pair of conductors 109 serving as an input connection to the multiplying circuit 108, which may therefore be arranged to multiply directly three fluctuating unidirectional voltages supplied by the connections 106, 107 and 109 to give a unidirectional output voltage. Such an output voltage is supplied to a pair of conductors 52 serving as an input connection to the radius-to-time-delay converter 48 shown in Fig. 3.

The distorting amplifiers 104 and 105 are similar in arrangement and principle of operation and therefore only one of them need be described in detail. The amplifier 104 has a load resistor 111 connected in series with its anode lead to the positive terminal of an anode supply source 112. The anode voltage is supplied to the multiplying circuit 108 through the connection 106, and the output of the demodulator 101 is applied to the control electrode through a pair of conductors 113. If necessary, the demodulator 101 may include an amplifier for supplying to the tube 104 a voltage of sufficient magnitude to enable the amplifier 104 to distort the input voltage. For biasing the tube 104 at the point at which increasing values of input voltage produce successively greater degrees of saturation, a bias voltage source 114 of suitable voltage is provided.

Referring to Fig. 14, representing a secant curve plotted against angle, it will be observed that the portions of the curve in a region near zero and 180° are relatively flat as compared with a cosine curve which has a relatively sharp peak. Likewise, the portions of the curve in the region near 90 and 270 degrees are very steep as compared with the slope of a cosine curve near 90 and 270 degrees. Furthermore, the slopes at all points are reversed as compared with the slopes of a cosine curve. The reversal of slope is produced by a vacuum tube amplifier which is resistance coupled to the output because such an amplifier acts as a phase inverter.

The flattening of the curve near zero degrees and the steepening of the slope near 90 degrees and 270 degrees is accomplished by the distorting characteristic of the amplifier 104.

Although my invention is not limited to the use of any particular class of electric valves or vacuum tubes the required characteristics may be obtained by the use of tubes having relatively sharp cut-off and having their plate voltage versus plate curves crowded more closely together to the zero by its curve. For example, pentode vacuum tubes may be used of the 6AC7 or the 6SJ7 type.

When utilizing tubes of this type referring to the tube 104 shown in Fig. 13, the load resistor 111 preferably has a resistance greater than that which provides the greatest degree of linearity of the load characteristic, for example, two or three times the resistance for maximum linearity. In order to obtain the desired distorting characteristics for increasing voltage inputs it is desirable to have the load line of the tube, drawn on the plate current-plate voltage curve, less in slope than the load line which provides maximum linearity. This is accomplished by utilizing relatively high load resistance.

It will be recalled that when the radiator 11, with reference to Fig. 3, is in the angular positions between 90 and 270 degrees, the radio beam 13 is pointing upwards, and the computed values of distance to ground have no significance because the beam 13 never strikes the ground. The distorting amplifier 104 provides a constant output voltage for the values of θ between 90 and 270 degrees because during these angles the value of cosine becomes negative so that the control electrode of the tube 104 is simply driven more negative. The value of the bias source 114 is such that the tube 104 is biased slightly beyond cutoff and therefore the output voltage for zero input and slightly higher is equal to the voltage of the supply source 112. Accordingly, negative input voltages have no further effect and between 90 and 270 degrees the output voltage remains as a constant value, the voltage of the source 112 as represented by the line 115 in Fig. 15.

Inasmuch as the secant curve in Fig. 14 becomes infinite in value in the regions near 90 and 270 degrees, corresponding to values of the cosine near zero, such values are beyond the range of the amplifier 104 and its output voltage actually reaches the maximum voltage, that of source 112 over a wider angular range, e. g., between approximately 85 and 275 degrees, as indicated in Fig. 15.

The constants of the circuit may be so chosen that the maximum voltage 115 of the output curve shown in Fig. 15 is approximately equal to the radius voltage corresponding to the maximum range R of the locator apparatus. In this manner the computer serves to supply a control voltage to the indicator 42 which reduces the effective range of the receiver and indicator when the radio beam 13 is pointed toward the ground, but has no effect when the radio beam is pointed upwards, or makes such a small angle with the ground that the distance to ground exceeds the maximum range of the apparatus.

It will be apparent that except for displacement in phase, the amplifier 105 will produce a curve having the same shape as the output curve of the amplifier 104. As shown in Fig. 13, the output wave shape 116 of amplifier 104 simulates a secant curve and the output wave shape 117 of the amplifier 105 simulates a cosecant curve.

*Elimination of ground reflection by electrical ground distance measurement*

In accordance with another embodiment of my invention, the distance to ground along the radio beam axis 13 is measured electrically. Such a system is represented schematically in Fig. 16. The structure of the scanner equipment illustrated is similar to that represented schematically in Fig. 3 except that the angle transmitters 26 and 31 may be omitted; likewise the gyro system 53 is omitted. It will be understood, however, that my invention is not limited to the type of scan or to the type of indication, which has been described for the sake of illustration.

A moving gate is applied to a suitable portion of the target-responsive indicating apparatus including the receiver 41 and the indicator 42. For example, it may be applied to a channel in the receiver 41 or to the indicator 42, as in the arrangement of Fig. 3. For supplying such a moving gate to moving gate terminals 47, a moving gate generator 118 is provided, which is responsive to target range measurements obtained from the receiver 41 through a connection 119. In effect, the apparatus of Fig. 16 utilizes the range measurements produced by the receiver 41 whenever the radio beam 13 strikes the ground, in order to produce a moving gate having a length corresponding to the range measurement which, in this case, is the distance to ground.

As illustrated in Fig. 17, where the curve 121 represents the maximum scanning angle or cone of the radiator 11 with a counterclockwise direction of spin and with the maximum radial range of the apparatus, as soon as the radio beam has been turned sufficiently low a beam as long as the maximum effective range strikes the ground at a point A and the receiver 41 produces a range measurement $r_0$. As the radiator 11 continues to rotate, the measured range becomes progressively shorter, as represented by the radii 1, 2, 3, etc., up to $r_{10}$, which is the minimum value corresponding to the position of the radiator 11 with the beam 13 in its lowermost position. As the radiator 11 continues to spin, the ground range increases again until the beam strikes the point B, after which a beam as long as the maximum effective range no longer strikes the ground, and there is no further need for eliminating ground reflection. It will be understood that the radius $r_0$ of the circle 121 represents the maximum range R of the apparatus.

For producing a moving gate continuously proportional to the varying values of $r$, measured by the receiver 41, a suitable circuit such as a vacuum tube circuit may be employed. Such a circuit is illustrated in Fig. 18.

*Ground distance measurement circuit*

As illustrated in Fig. 18, the moving gate generator 118 as a whole comprises a square wave generator 122 adjustable with regard to the length of the wave produced thereby, a range gate generator 123, means for coupling the range gate generator 123 to the square wave generator 122, which coupling means may take the form of a buffer or cathode follower stage 124, for example, a second range gate generator 125 synchronized with the output of the first range gate generator 123, a pair of coincidence devices 126 and 127, a pair of low time constant peak voltmeters 128 and 129, a pair of integrators 131 and 132, a gate-width limiting diode 133, a bias adjusting device 134 with a feed-back connection 135 to the square wave generator 122, and a constant current device 136 associated with the bias adjusting device 134.

The adjustable square wave generator 122 may take the form of a single-pulse multivibrator circuit comprising a pair of electric valves, such as triode vacuum tubes 137 and 138, for example. The tubes 137 and 138 have conventional load resistors 139 and 141, respectively, and have a common cathode-resistor 142 for coupling the tube 137 to the tube 138. For coupling the tube 138 to the tube 137, resistance-capacity coupling is employed comprising a coupling condenser 143 and a grid lead resistor 144 connected between the control grid of the tube 138 and the positive terminal of a source of anode voltage supply 145 for positively biasing the tube 138.

The initial tube 137 has a control electrode or grid 146, capacity coupled to the trigger-pulse input terminals 51, and also connected through a grid resistor 147 to the conductor 135 providing a bias potential.

The square wave generator 122 is designed to have the output square wave appear at an output terminal 148 which is electrically connected to the anode of the tube 138. The output terminal 148 may be connected or coupled to the indicator control connections or moving gate terminals 47.

The cathode-follower stage 124 may take the form of a triode vacuum tube having a control grid coupled to the output terminal 148 of the square wave generator 122 through a coupling condenser 149 and a grid resistor 151.

The cathode-follower stage 124 includes a cathode resistor 152 with a coupling by means of a peaking condenser 153 to the first range gate generator 123 for synchronizing the latter with the termination or descending potential portion of the square wave appearing at the square wave output terminal 148. The capacity of the condenser 153 is made relatively small in order to produce the peaking action.

The range gate generator 123 may take the form of a blocking oscillator comprising an electric valve such as a triode vacuum tube 154, for example, having a pair of transformer primary windings 155 and 156 each connected in series with the anode lead to the anode supply source 145. In inductive relation to the transformer winding 155 is a transformer winding 157 connected at one end to the negative terminal of the supply source 145 through a grid resistor 158 and connected at the other end through a condenser 159. A junction terminal 161 of the winding 157 and the resistor 158 is connected to the control grid 162 of the triode 154.

In inductive relation to the transformer primary winding 156 is a secondary winding 163 across which a potentiometer resistor 164 may be connected. Associated with the potentiometer resistor 164 is a movable tap 165 for providing an adjustable amplitude output voltage which will be in the form of a square wave by virtue of the known characteristics of the blocking oscillator circuit 123.

The second range gate generator 125 is coupled to the first range gate generator 123 through a differentiating or peaking circuit including a condenser 166 for synchronizing the generator 125 with the end of the output wave of the generator 123.

The second range gate generator 125 may also be in the form of a blocking oscillator having elements and connections which are similar to those described in connection with the range gate generator 123. A potentiometer including a movable brush 167 is provided for supplying an adjustable amplitude square wave output.

The coincidence devices 126 and 127 are double input electric control devices and may take the form of vacuum tubes, so arranged as to have two input or control connections each. Thus each tube should be at least a tetrode with a pair of control electrodes or grids. As shown, however, the tubes 126 and 127 are in the form of pentagrid converters having conventional pairs of shield grids and conventional suppressor grids. The tube 126 has a first control electrode or grid 168 coupled in any suitable manner, as by means of a coupling condenser 169 and a grid leak resistor 171, to the output terminal 167 of the second range gate generator 125. In a similar manner, the tube 127 has a first control electrode or grid 172 resistance-capacity coupled to the output terminal 165 of the first range gate generator 123. The tubes 126 and 127 also have second control electrodes or signal grids 173 and 174, respectively, separately resistance-capacity coupled to an input connection 119 from the receiver 41 (Fig. 16). The connection 119 is the one at which the receiver 41 supplies what is customarily known as the video output, which will be the ground signal in case the radio beam axis 13 is pointed toward the ground.

For supplying anode-cathode current to the tubes 126 and 127 in parallel a source of unidirectional voltage 175 may be provided. Pulse transformers are provided with primary windings 176 and 177 in series with the anode connections of the tubes 126 and 127, respectively. In inductive relation to the transformer windings 176 and 177 are secondary windings 178 and 179, respectively, and for adjustment of the magnitude of the pulse output, potentiometers having output taps 181 and 182 are provided. The secondary windings 178 and 179 are connected to give output voltage of polarity opposite to the anodes of the tubes 126 and 127.

The tubes 126 and 127 are preferably of a type such as those sold as 6SA7 tubes in which driving either grid 168 or 173 (in the case of the tube 126) below a cutoff potential extinguishes current irrespective of the potential of the other grid. It will be understood that the shield grids are maintained at a substantially fixed potential and that the suppressor grid of each tube is maintained at cathode or ground potential.

The low time constant peak voltmeters 128 and 129 may be in the form of electric valves such as triode vacuum tubes having their control grids resistance-capacity coupled to the output terminals 181 and 182 of the coincidence devices 126 and 127, respectively. In order to cause the tubes 128 and 129 to function as peak voltmeters or pulse wideners to spread the wave, condensers 183 and 184, respectively, are connected between the cathodes of the tubes 128 and 129 and the negative terminal of the supply source 175. For reducing the time constant of the peak voltmeters to a relatively low value, resistors 185 and 186 are shunted across the condensers 183 and 184, respectively. The time constants of the circuits 183, 185 and 184, 186 are so chosen that the condensers 183 and 184 discharge within a time duration of the order of magnitude of the pulse repetition rate of the pulse system with which the apparatus is employed.

For establishing a biasing potential for the square wave generator 122 which will depart from the average value in accordance with the relative magnitudes of the voltages measured by the devices 128 and 129, the integrators 131 and 132 are provided and they are connected in series. They may take the form of electric control devices or electric valves such as triode vacuum tubes having control electrodes or grids resistance capacity coupled to the cathodes or output connections of the peak voltmeter tubes 128 and 129, respectively. The tube 132 is negatively biased and the tube 131 is adjustably biased by means of a potentiometer tap 170 cooperating with a series resistor 180 connected between the devices 134 and 136.

The junction terminal 187 of the integrator tubes 131 and 132 serves as the bias control potential output for the integrator circuit.

For limiting the potential output and thereby limiting the gate width of the circuit of Fig. 18, the gate width limiter 133 is connected between the integrator output terminal 187 and a voltage divider terminal 188. The voltage divider terminal 188 may be the junction terminal of a pair of resistors 189 and 191 connected in series to the supply source 175. For avoiding abrupt variations in the potential of the terminal 188, a by-pass condenser 192 may be connected across the resistor 191. The gate limiter 133 may take the form of an unsymmetrical current conducting device, rectifier, diode vacuum tube, or the like. The limiter 133 is connected with its cathode at the potential-divider terminal 188 and its anode at the integrator terminal 187.

Although the devices 131, 132 have been referred to as integrators for the sake of identification, it will be understood that in order to obtain fast action of the circuit, the arrangement is preferably such that excessive smoothing action or integration is not obtained. To this end the circuit constants are so selected that the capacity loading on the integrators 131, 132 is not so great as to slow down the action of the circuit. Distributed capacity may be relied upon to provide the requisite degree of integration. If a separate condenser 190 is employed its capacity should be relatively small.

The circuit 131—132 may be thought of as a mixer for providing a single-ended output from two inputs rather than as an integrator inasmuch as little integration is desired.

For supplying the potential of the integrator output terminal 187 to the bias connection 135 of the square wave generator 122, without reaction between the stages of the circuit, the cathode follower 134 may be interposed between the terminal 187 and the connection 135. The cathode follower 134 is shown as comprising a triode vacuum tube with a control electrode directly connected to the integrator output terminal 187.

For causing the circuit to drift to a maximum gate indication in case no input signals are received from the receiver 41 through the connection 119, a relatively large resistor or bleeder 193 is connected between the control electrode and the anode of the tube 134.

For supplying a control grid bias to the integrator tube 131, and maintaining the bias constant with respect to the potential of the point 187, the constant current device 136 is connected in series with the cathode lead of the tube 134 and for adjustment of bias, as previously explained, the potentiometer 170, 180 is connected in series between the tubes 134 and 136. The tube 136 may take the form of a pentode having a conventional suppressor grid tied to ground and having a screen grid 194 connected through a dropping resistor 195 to the positive terminal of the supply source 175. However, the control grid 196 of the tube 136 is permanently tied to ground or the negative terminal of the supply source 175, causing the tube 136 to conduct a substantially constant current. A cathode resistor or stabilizer may be provided.

*Operation with electrical ground distance measurement*

Figure 19:
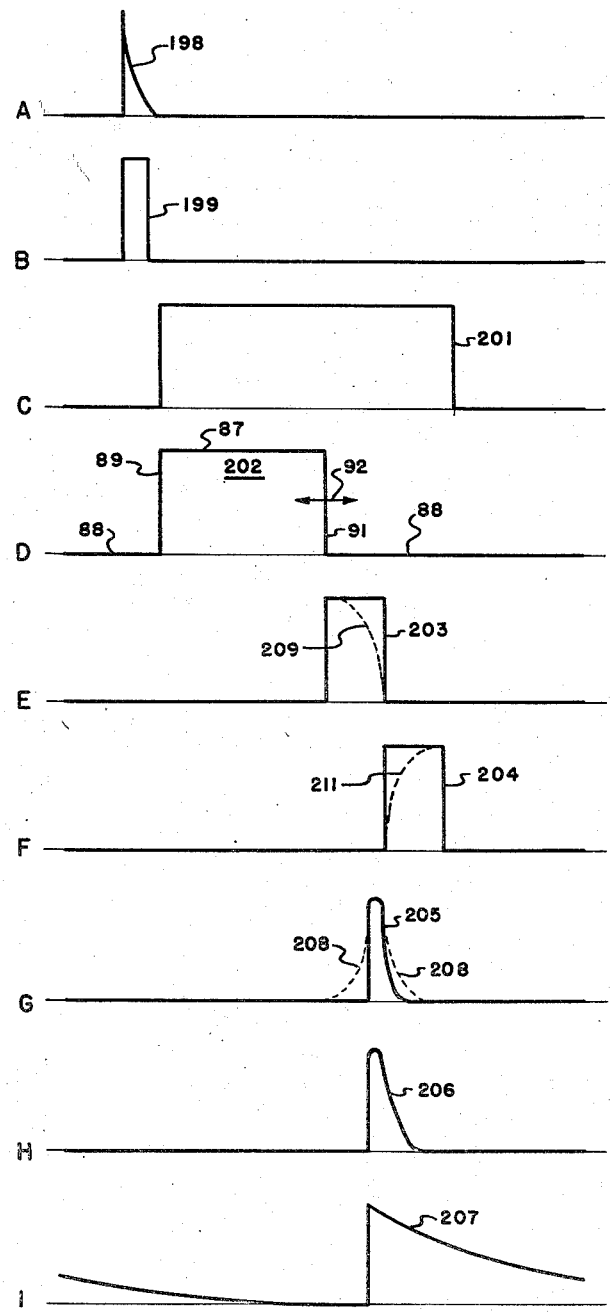

The principle of operation of the circuit of Fig. 18 and of the apparatus of Fig. 16 as a whole is illustrated by the graphs of Fig. 19. It will be understood that in radio locator systems of the type to which reference is made herein, the transmitter (not illustrated) and the receiver 41 are synchronized in action by means of a triggering pulse which is ordinarily generated by a generator associated with the transmitter. Such a triggering pulse is represented by the peaked wave 198 in Fig. 19A. Such pulses are repeated at a suitable repetition rate which may equal 2,000 per second, e. g., in certain types of radio locator apparatus. In response to each such trigger pulse 198, a pulse 199 as shown in Fig. 19B is produced by the transmitter. The pulse 199 is actually in the form of a wave train of high frequency microwave oscillations, for example, a train of 3000 such oscillations in the case of 10 centimeter waves each continuing for a pulse duration of one micro-second. The pulse wave form 199, therefore, actually represents the rectified envelope of such a transmitted pulse consisting of microwave oscillations directed in a beam by the radiator 11 along the beam axis 13.

In such radio locator apparatus known means have also been provided for producing a so-called wide gate, which is a square wave of relatively long duration, as illustrated at 201 in Fig. 19C. The means for providing such a wide gate are so designed that the gate begins after the termination of the transmitted pulse and terminates well before the production of a succeeding transmitted pulse. The gate 201 is supplied to the receiver 41 through the wide gate terminals 45 in order to render the receiver 41 responsive only during the time period between transmitted pulses so that the receiver can pick up only reflected pulses and will not be responsive to direct transmission of energy from the transmitted pulse 199.

Such receivers are customarily provided with a second gate input terminal referred to as a narrow gate connection for further limiting the time duration during which the receiver is responsive in order to cause the apparatus to pick up reflections from only a particular target region, for example, when so desired. In place of using such a narrow gate connection in the customary manner, I may supply a moving gate to such terminals or I may supply a moving gate to suitable control connections 47 of the indicator 42 as described in connection with the apparatus of Fig. 3.

Assuming the latter arrangement, a moving gate having the form illustrated at 202 in Fig. 19D (corresponding to Fig. 7) is produced by the moving gate generator 118, Fig. 16, and supplied to the control connection 47 of indicator 42. Since the moving gate generator 118 is synchronized through the trigger input connection 51, which directly or indirectly synchronizes also the wide gate 201 of the receiver 41, the moving gate 202 may be arranged to commence at the same instant as the wide gate 201 of the receiver.

Referring to Fig. 18, the moving gate is formed by the multivibrator 122 in the manner described in connection with Fig. 6. The gate length is determined by the bias fed back through the conductor 135, which corresponds to the connection 52 of Fig. 6. The termination of the moving gate 202 along the vertical descending line 91 (Fig. 19D) trips the range gate generator 123 and causes a relatively short time duration square wave or range gate 203 to be generated (Fig. 19E). The time duration of the square wave 203 is fixed, being determined by the circuit constants of the generator 123. In a similar manner, the termination of the first range gate 203 trips the second range gate generator 125 and causes the commencement of a second range gate 204 (Fig. 19F). The range gates 203 and 204 are displaced along the time axis but are substantially contiguous, i. e., one begins approximately when the other ends.

A signal received by the receiver 41 and supplied to the moving gate generator 118 through connections 119 has a wave form 205, as illustrated in Fig. 19G. For reasons which will be explained hereinafter, the form 205, which is a ground signal when the receiver is receiving reflections from the ground, is caused to divide substantially equally between the time periods represented by the first and second range gates 203 and 204.

Assuming that a variation has taken place in the distance to ground causing the ground signal 205 to occur earlier or later than the assumed time of occurrence, all or a preponderant portion of the ground signal 205 will occur during the time interval of one of the range gates 203 or 204. Assuming, for example, that distance along the radio beam 13 to ground is decreasing, a preponderant portion of the ground signal 205 will take place during the time period of the range gate 203. In this case, the coincidence device 127 (Fig. 18) will have both of its control grids 172 and 174 energized simultaneously, the grid 174 being energized by the ground signal received from the connection 119, and the grid 172 being energized by the output wave 203 of the pulse generator 123.

A relatively strong output pulse 206 will therefore be supplied to the peak voltmeter 129. The other coincidence device 126, however, will not be caused to carry current, or will carry only relatively little current, for the reason that although a ground signal is supplied to the screen grid 173 from the receiver connection 119 the control grid 168 will either not be energized at all during the continuance of the ground signal 205, or be energized for only a minute final fraction of the time duration of the ground signal 205. Consequently, the integrator tube 132 will have a greater input than the integrator tube 131, causing its impedance to fall thereby lowering the potential of the integrator output terminal 187. This in turn causes the cathode follower 134 to increase its impedance, and to reduce the potential of the feedback connection 135, since current is held constant by the device 136 and its impedance falls to hold the current constant. This fall in potential lowers the bias of the square wave generator 122, causing the length of the output wave to be reduced.

Inasmuch as the peak voltmeters 128 and 129 have sloping output wave forms, as illustrated in Fig. 19I, a smooth variation in the integrator output is obtained with variations in the portion of the ground signal 205 occurring during the time durations of the first and second range gates 203 and 204. The signal fed back through the connection 135 is progressively varied in response to successive transmitted pulses and corresponding successive reflected ground signals so as to adjust the time duration of the moving gate 202 and to cause the ground signal 205 to be split with respect to the time of occurrence between the range gates 203 and 204.

Variations in the distance to ground along the radio beam axis 13 take place continuously whenever the beam is pointed toward the ground. These are cyclical variations due to the spinning action of the scanner as illustrated by Fig. 17. The nod action also causes cyclical variation. Furthermore, if the aircraft pitches or if it changes in altitude, variations result in radial distance to ground. The latter variations are not cyclical but are also continuous or progressive. The moving gate circuit of Fig. 18 continuously follows all such variations and eliminates the ground signal from the screen 21 of the indicator 42. Referring to Fig. 17, it will be seen that the gate length of the moving gate must be a maximum when the beam strikes the ground at the point A, must then decrease progressively to represent decreasing distance to ground until the point E is reached, and then must increase to a maximum at the point B. During the time interval required for the beam to rotate from the point B counterclockwise back to the point A, the gate length should remain a maximum. The drift resistor 193 (Fig. 18) insures that the apparatus will remain at maximum range in readiness for the moment when the beam strikes the ground at point A. The variations referred to are progressive and therefore the gate 202 follows progressively to control the indicator 42. However, if a target should be located, the signals reflected therefrom will represent a discontinuity and will not affect the auto ranging apparatus of Fig. 18 or the moving gate 202. The automatic reduction of range to less than slant distance to ground along the beam axis takes place regardless of the type of scan employed.

It will be understood that the connection 119 from the receiver must be taken from a point in the receiver circuits ahead of the point at which a moving gate control voltage is applied in order to leave the appropriate channel of the receiver 41 active long enough to produce the ground signal 205. It will be seen from Fig. 19, however, that the moving gate 202 is terminated before the occurrence of the ground signal 205. Consequently, the ground signal does not appear in the portions of the receiver following the moving gate connection, and does not appear in the indicator 42.

If exceedingly rapid variations in the rate of change of distance to ground are anticipated it may be desirable to provide means to make the gain of the auto ranging circuit become greater with larger error, that is, larger deviation between the position of the ground signal 205, referring to Fig. 19G, and the position of the common sides of the range gates 203 and 204. This may be accomplished by reforming the ground signal 205 so as to form a relatively triangular wave shape, shown for example by dotted lines 208. Conversely the same results may be accomplished by modifying the form of the range gates 203 and 204 by rounding off the negative discontinuity of gate 203 along the dotted line 209 and similarly rounding the positive discontinuity of the range gate 204 along the dotted line 211, as shown in the Figs. 19E and 19F. Suitable circuits for effecting such modification in the shape of the range gates may be employed. Although I may modify the arrangement of the range gate generators 123 and 125 to effect the desired change in shape of the range gates, for the sake of simplicity in the drawing, I have indicated the means for effecting the change in range gates schematically by means of rectangles 212 and 213 (Fig. 18) representing suitable wave shaping circuits.

Runway approach control

The elimination of ground or surface reflections in accordance with my invention is valuable for increasing the effectiveness of object location regardless of the purpose for which the object location equipment is primarily used. For example, it is valuable for increasing the safety of aviation by making object location equipment responsive to the presence of other aircraft or responsive to stationary obstacles jutting upward from the ground. The elimination of ground reflections is particularly valuable, however, for certain purposes such as traffic control and runway approach control because in crowded airports, a large number of planes may desire to land at substantially the same time during a fog or other conditions when visibility is low and the pilots must resort to blind landing or depend on directions from airport control centers. In accordance with my invention, the traffic control may be transferred from the airport to the airplane itself. Such control will be much more effective because the operator in an airport control center is aware only of the presence of airplanes which have communicated with the operator; whereas the pilot of an airplane equipped with radio object location apparatus, having the ground reflections eliminated in accordance with my invention, has an indication upon his screen not only of the presence of other aircraft but also of their exact orientation. Accordingly, in accordance with my invention, it is unnecessary for airplanes to land one at a time awaiting instructions from an airport control center and pilots may land in rapid succession after assuring themselves of the absence of aircraft or other obstacles in the intended line of approach to the airfield. For example, referring to Fig. 2, if the pilot of the airplane 18 desires to make a landing at a landing field located at the point 20, the pilot knows that such a landing can safely be made if another aircraft is located at the point 23' but not if another aircraft is located below him at the point 93.

The elimination of ground reflections makes it possible for the pilot of the airplane 18 to obtain an indication of an obstacle at the point 93 without obliteration of the indication by the ground interference 26 (Fig. 1).

The elimination of ground reflections from the screen 21 also enables a pilot when approaching an airfield to descend along a more gradual slope, that is, to reduce altitude a greater distance from the landing field than would otherwise be possible, in view of the danger of striking tall chimneys, water towers and the like, which may be relatively close to the landing field and not visible during a fog. Since the radio beam 13 encounters a discontinuity when it is swept past such a sharp obstruction as a tall chimney or water tower, the automatic range apparatus of Figs. 16 and 18 will not interfere with the indication of such an obstruction on the screen 21. Nevertheless the gradually changing measured distance to ground or continuous range variation resulting from the radio beam 13 sweeping along the ground, when it is pointed toward the ground, will maintain the effectiveness of the auto ranging equipment for eliminating ground or surface reflections. This will be true even in the case of rolling ground and areas with gradually varying slopes whereas sharp obstructions such as cliffs, edges of canyons and upwardly protruding obstacles such as towers will represent discontinuities and produce indications on the screen 21.

The characteristics of my ground-reflection-elimination apparatus make obstacles stand out more clearly on the screen 21 and prevent relatively smooth or gently rolling ground representing a good landing surface from producing obliterating indications.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Object locator circuits comprising a coincidence circuit having a pentagrid converter tube having an anode, a cathode and first, second, third, fourth and fifth control electrodes, first input coupling means connected to said first control electrode for supplying a receiver input signal, second input coupling means connected to said third control electrode for supplying a range gate input signal, electric energy supply means connected for applying anode-cathode current to said tube and controlled by signals supplied from said first and second input coupling means and extinguishable by either of them, means connected to said energy supply means for maintaining said second and fourth control electrodes at a substantially constant potential for shielding said third control electrode from the others, and means also connected to said energy supply means for maintaining said fifth control electrode at substantially cathode potential.

2. Object locator circuits comprising a coincidence circuit having principal signal input terminals for supplying a principal signal, first and second comparison signal input terminals, means for supplying to said comparison signal terminals signals which are displaced in time relation but substantially contiguous, a first double input electric control device of the type having a single output and two independent control elements, either of which is independently capable of extinguishing current in the control device, a second double input electric control device of the type having a single output and two independent control elements, either of which is independently capable of extinguishing current in the control device, one of said control elements of each of said control devices being coupled to said principal signal input terminal, the other of said control elements of said first device being coupled to said first comparison signal input terminal, and the other of said control elements of the second electric control device being coupled to the second comparison signal input terminal, third and fourth electric control devices connected in series, having a junction terminal and each having a control element, coupling means between the control element of the third control device and the output of said first control device, and coupling means between said fourth control device and the output of said second control device, whereby the potential of the junction terminal of said third and fourth control devices varies in accordance with variation in time of occurrence of a signal applied to said principal signal input terminals in relation to the signals at said comparison signal input terminals.

3. Object locator circuits comprising a coincidence circuit having principal signal input terminals for supplying a principal signal, first and second comparison signal input terminals, means for supplying to said comparison signal terminals signals which are displaced in time relation but substantially contiguous, a first double input electric control device of the type having a single output and two independent control elements, either of which is independently capable of extinguishing current in the control device, a second double input electric control device of the type having a single output and two independent control elements, either of which is independently capable of extinguishing current in the control device, one of said control elements of each of said control devices being coupled to said principal signal input terminal, the other of said control elements of said first device being coupled to said first comparison signal input terminal, and the other of said control elements of the second electric control device being coupled to the second comparison signal input terminal, a first low time constant peak voltmeter responsive to the first electric control device, a second low time constant peak voltmeter responsive to the second electric control device, and means for comparing the magnitudes of indications of said low time constant peak voltmeters.

4. Object locator circuits comprising a square wave generator for producing a wave having abrupt termination, a generator for producing a range gate initiated by the termination of said first-mentioned square wave, a generator for producing a second range gate initiated by the termination of said first range gate, input signal terminals, and means independently responsive to two different inputs for comparing coincidence of signals applied to said input terminals with waves supplied by said first and second range gate generators.

5. Object locator circuits comprising a signal coincidence circuit having first and second comparison signal input terminals with means for supplying thereto comparison signals displaced in time relation but substantially contiguous, principal signal input terminals for reception of a signal to be compared in time relation with said comparison signals, a pair of electric control devices each having a pair of control elements, one of said control elements of each of said electric control devices being coupled to said principal signal input terminal and the remaining control elements of said electric control devices each being coupled to a different one of said comparison signal input terminals, means responsive to said electric control devices for producing a potential varying from a normal value in accordance with variations in time relation with respect to said comparison signals of a signal which may be supplied to said principal signal input terminal, and a cathode follower electronic stage having a control element, coupling means between said variable potential means and said control element, and high resistance means for positively biasing the control element of said cathode follower stage for causing the output thereof to drift to a maximum in the event of failure of signal input to said principal signal input terminal.

6. Object locator circuits comprising a signal coincidence circuit having first and second comparison signal input terminals with means for supplying thereto comparison signals displaced in time relation but substantially contiguous, a principal signal input terminal for reception of a signal to be compared in time relation with said comparison signals, a pair of electric control devices each having a pair of control elements, one of said control elements of each of said electric control devices being coupled to said principal signal input terminal and the remaining control elements of said electric control devices each being coupled to a different one of said comparison signal input terminals, means responsive to said electric control devices for producing a potential varying from an average value in accordance with variations in time relation with respect to said comparison signals of a signal which may be supplied to said principal signal input terminal, and means for biasing said potential varying means to produce drift to maximum output in the event of failure of signal input to said principal signal input terminal.

7. Object locator circuits comprising a signal coincidence circuit having first and second comparison signal input terminals with means for supplying thereto comparison signals displaced in time relation but substantially contiguous, a principal signal input terminal for reception of a signal to be compared in time relation with said comparison signals, a pair of electric control devices each having a pair of high-impedance input control elements, one of said control elements of each of said electric control devices being coupled to said principal signal input terminal and the remaining control elements of said electric control devices each being coupled to a different one of said comparison signal input terminals, and means for comparing the outputs of said electric control devices.

8. Object locator circuits comprising a signal coincidence circuit having a pair of coincidence devices with input terminals for receiving a signal and input terminals for receiving time displaced range gates, said coincidence devices having anode circuits and phase inversion transformers connected thereto, and a pair of peak voltmeters, each of said voltmeters being coupled to one of said coincidence devices.

9. Object locator circuits comprising a pair of pulse generators for producing two time displaced substantially contiguous range gates, means for rounding the end of the first range gate and the front of the second, a coincidence comparison circuit jointly responsive to said range gates and an input signal, and means responsive to said latter circuit for producing an output varying with the relative degrees of coincidence of said range gates with the signal input to said input comparison circuit.

ROBERT F. MOZLEY.

REFERENCES CITED

The following references are of record in the file of this patent:

UNITED STATES PATENTS

| Number | Name | Date |
|---|---|---|
| 1,895,774 | Smets et al. | Jan. 31, 1933 |
| 2,178,340 | Geiger | Oct. 31, 1939 |
| 2,200,130 | Lewis et al. | May 7, 1940 |
| 2,221,517 | Holters | Nov. 12, 1940 |
| 2,333,605 | Watson | Nov. 2, 1943 |
| 2,403,429 | Anderson | July 9, 1946 |